Sept. 14, 1965  N. POMASANOW  3,205,872
ROTARY INTERNAL COMBUSTION ENGINE
Filed May 23, 1961  3 Sheets-Sheet 1

INVENTOR.
N. Pomasanow
BY Richards & Geier
ATTORNEYS

Sept. 14, 1965  N. POMASANOW  3,205,872
ROTARY INTERNAL COMBUSTION ENGINE
Filed May 23, 1961  3 Sheets-Sheet 2

INVENTOR.
N. Pomasanow
BY Richards Geier
ATTORNEYS

Sept. 14, 1965   N. POMASANOW   3,205,872
ROTARY INTERNAL COMBUSTION ENGINE
Filed May 23, 1961   3 Sheets-Sheet 3

INVENTOR.
N. Pomasanow
BY Richards & Geier
ATTORNEYS

United States Patent Office 3,205,872
Patented Sept. 14, 1965

3,205,872
ROTARY INTERNAL COMBUSTION ENGINE
Nikolay Pomasanow, 1431 Madison Ave.,
New York, N.Y.
Filed May 23, 1961, Ser. No. 112,041
7 Claims. (Cl. 123—8)

This invention relates to improvements in rotary internal combustion engines of the type employing multi-lobed rotors instead of reciprocating pistons, as, for example, the type of engine described in U.S. Letters Patent No. 2,947,290, issued August 2, 1960, to W. G. Froede.

Engines of this type have the drawback of inadequate control of compression and excessive speeds. Lubrication of movable parts of these engines is often inadequate. Furthermore, sealing elements used in conjunction with these engines have the tendency of wearing out quickly.

An object of the present invention is to eliminate these drawbacks of prior art constructions and to provide a rotary internal combustion engine of novel design which can be constructed for an desired H.P. range and which can be driven by light as well as heavy fuel.

Another object is the provision of a rotary internal combustion engine having an internal compression chamber of novel design, provided with improved lubricating means, having an economic consumption of combustion fuel and lubricant and which may effectively operate at any desired rating, particularly at speeds of 6–8,000 r.p.m., as compared to prior art speeds of 16,000 r.p.m., thereby making the engine most suitable for stationary service and automobile industry.

A further object is the provision of an engine of the described type which will have longer life, greater efficiency, less heat development and a smoother cycle sequence, than those of prior art engines.

Yet another object is the provision of an engine of the described type which will be of compact size and which will have a lesser number of moving parts than prior art engines, whereby these parts will be simple to manufacture and operate.

Other objects of the present invention will become apparent in the course of the following specification.

In accomplishing the objects of the present invention it was found desirable to shape the engine casing in the form of an ellipse, since this makes it possible to conveniently conform the combustion chamber to the size and eccentric location of the triangular rotor, thereby providing for a smooth movement of the rotor. The rotor carries angular elements or seals which are set at 120° apart in the rotor system which rotates in an elliptical fashion. The arrangement of these elements makes it possible to effectively insulate one sector of the chamber from another sector at all points and at any angle without any danger of gas leakage. Furthermore, the seals serve as lubricant carriers and effectively lubricate all surfaces which are exposed to friction and combustion (75% of all surfaces of the chamber).

The engine of the present invention despite the eccentric movement of the rotor, is directly coupled in a 1:1 ratio to the main shaft. Such coupling which is carried out by three levers, makes it possible to reduce the speed of the engine to about 6,000 to 8,000 r.p.m. Actually the difference between the eccentric movement of the rotor and the rotation of the main shaft is compensated by the use of three annular indentations located on the side walls of the rotor and guiding rollers carried by the levers, the diameters of the indentations being equal to the eccentricity of the rotor as compared to the main shaft. An important novel feature in the construction of said levers is that they are attached to the main shaft in such manner that at the critical moment of the cycle the force exerted upon the levers bears in the forward direction in a relation of 2.8:2.

According to another feature of the present invention adequate lubrication is provided by means of pipes located in shaft grooves and terminating in each sector of the motor. Oil drops introduced into a chamber are pulverized by the action of centrifugal force and emerge out of the pipe outlets in a vaporized state, thereby providing excellent lubrication of all parts of the engine.

The invention will appear more clearly from the following detailed description when taken in connection with the accompanying drawings showing, by way of example only, a preferred embodiment of the inventive idea.

In the drawings:

FIGURE 1 illustrates the outline of the combustion chamber having the form of an ellipse and of the rotor which rotates therein. It is apparent that the rotor can carry out its rotation smoothly and without any sharp changes in its motion.

FIGURE 2 shows an internal combustion engine having an elliptical casing 3 enclosing a combustion chamber 3d. The radii which describe the ellipse of the casing are so related that the triangular rotor which will be described in detail hereinafter, fits into the elliptical casing at any point of its curvature.

Figures 1, 2:
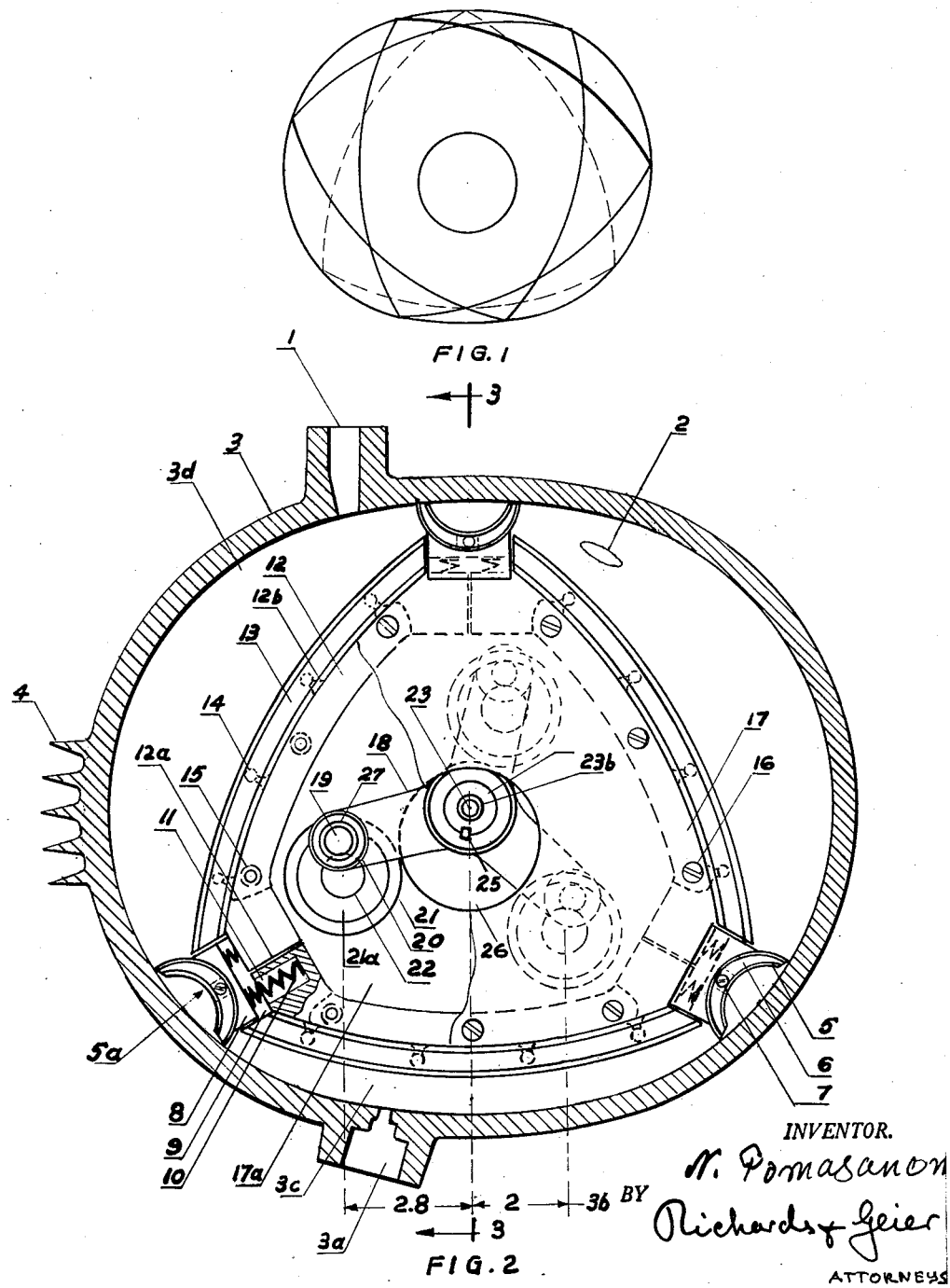
FIGURE 1 is a diagram showing the outline of the elliptical combustion chamber of the engine of the present invention and various positions of the rotor therein.
FIGURE 2 is a section through the engine of the present invention, some parts being shown in side elevation, and illustrates the rotor at the critical point of compression.

The casing 3 may be provided with outer ribs 4 for air cooling. This is particularly advisable if the engine is mounted in an enclosed space, so as to provide the best possible cooling of the outer surfaces of the engine.

A side wall of the casing 3 has an opening 2 for the intake of the fuel. Furthermore, the casing 3 has an opening 3a for the spark plug (not shown) and an exhaust opening 1.

Figures 3, 4:
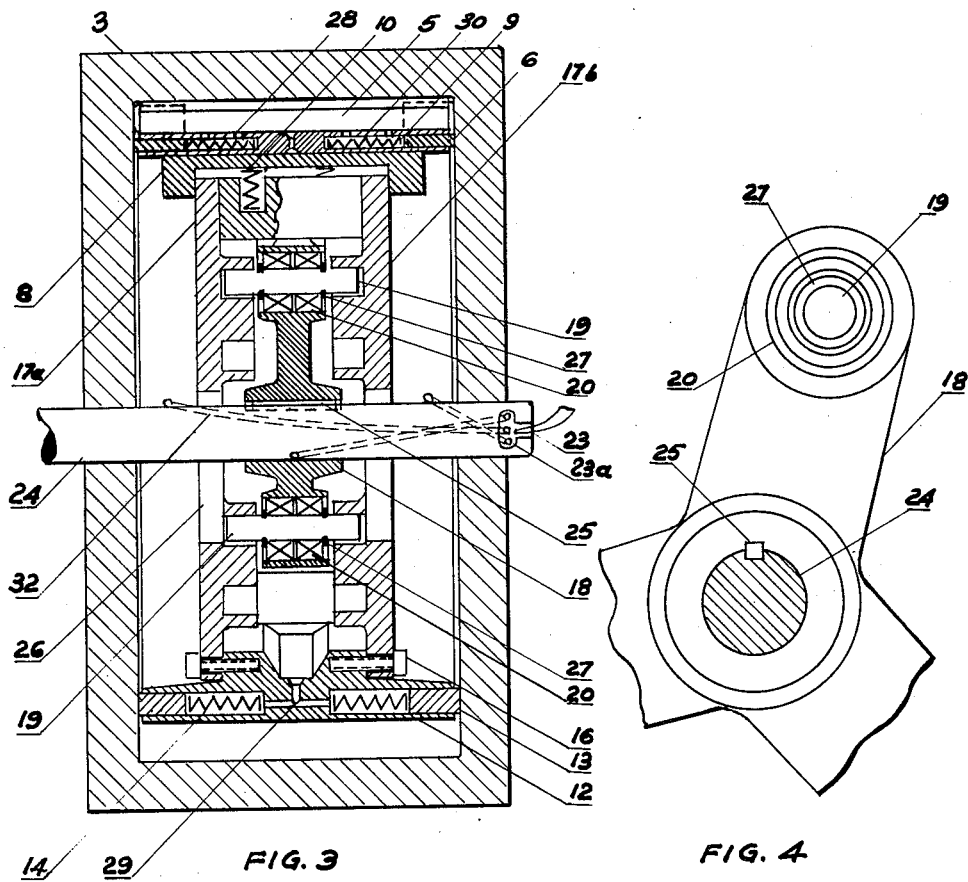
FIGURE 3 is a transverse section along the line 3—3 of FIG. 2 and illustrates the compression and lubrication systems of the engine.
FIGURE 4 is an enlarged fragmentary side view illustrating an actuating lever attached to the main shaft and carrying a roller mounted in a bearing.

As best shown in FIGURE 3, a central main shaft 24 is rotatably mounted in the casing 3 in bearings which are not illustrated.

Three levers 18 extending radially at angles of 120° to each other are joined by a central hub which is keyed at 25 to the shaft 24. The outer ends of the levers 18 carry bearings 20 provided with locking rings 27 and driving rollers 19 (FIG. 4).

Figure 6:
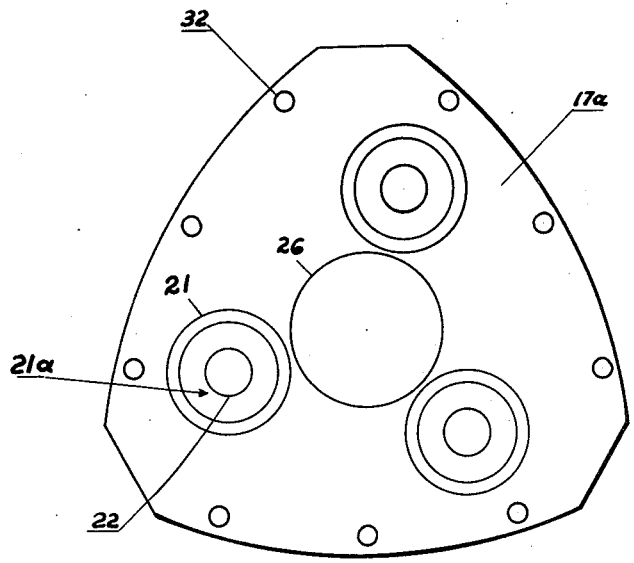
FIGURE 6 is an inner view of one of the side walls of the rotor.

The rotor includes two side plates 17a and 17b and three curved cleats 12. Each cleat completely covers a third of the side of the rotor and forms the chambers of the engine. As shown in FIG. 6 the side plates 17a and 17b are provided with annular indentations 21a the side walls 21 and 22 of which are adapted to engage the roller 19. The centers of the indentations 21a are shifted away from the corners of the rotor in the direction of rotation. Thus the rotary movements of the rollers 19 follows a circular path in these recesses.

It is apparent that the rollers 19 are located in different positions along their circular paths in each position of the rotor, depending on the location of the rotor relatively to the central shaft 24. The side plates 17a and 17b are provided with openings 26 through which the shaft 24 extends. The size of the openings 26 must be equal to the diameter of the shaft 24 plus the eccentricity of the rotor movement.

Figures 7, 8, 9:
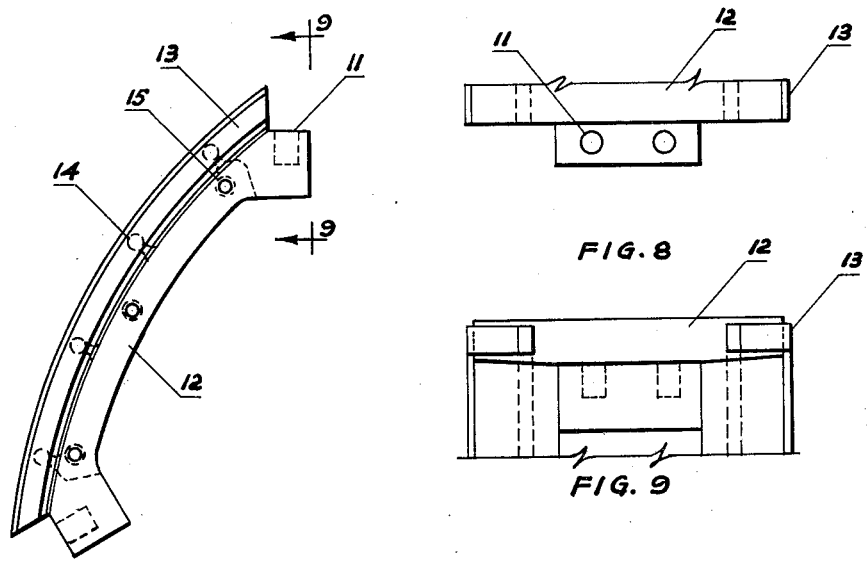
FIGURE 7 is a fragmentary front view of a portion of the rotor.
FIGURE 8 is a fragmentary side view of the part shown in FIGURE 7.
FIGURE 9 is a fragmentary end view, looking in the direction of arrows 9—9 of FIG. 7.

The cleats 12 carry members 13 which are pressed against the sides of the casing 3 by springs 14. The cleats 12 are connected to the plates 17a and 17b by screws 16 (FIG. 3) extending through openings 15 (FIG. 7). The cleats 12 are provided with inner passages 29 for the lubricating oil.

The lubrication system of the engine includes pipes 23a and 32 located in grooves 23 provided in the shaft 24. The grooves of the shaft clamp the pipes at about ¾ of their circumference. These pipes terminate in each sector of the motor, two at the sides and one in the center and they circle the shaft 24 in the opposite direction to the shaft movement. Oil is introduced into the pipes through an inlet 23a shown diagrammatically in FIG. 3. The outlets of the pipes should be cut at a certain slope in a direction opposite to that of the rotation of the shaft 24, so that oil will be vaporized as it leaves the outlets.

Figure 5A:
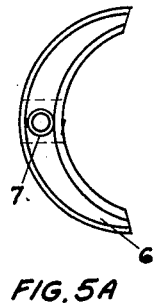
FIGURE 5a is a side view of a portion of the device shown in FIG. 5.
Figure 5:
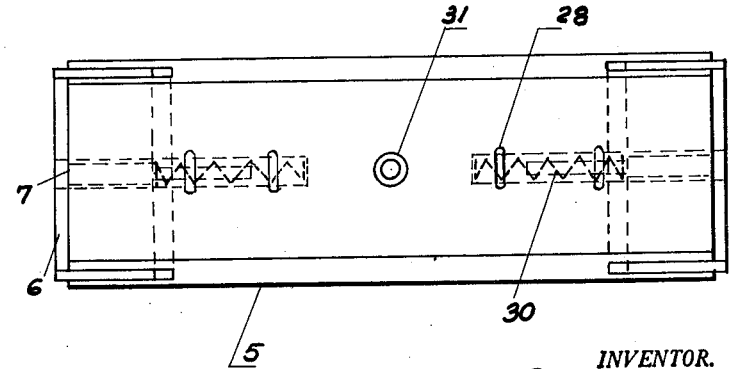
FIGURE 5 is a plan view of a semi-circular vane serving as a sealing device as well as a lubricating device.

The plates 17a and 17b and the cleats 12 are connected to supports carrying three double seals 5 which serve the double purpose of completely insulating by compression the sectors of the combustion chamber from each other and of facilitating the lubrication of the walls of the chamber by the oil vapors. Each double seal 5 comprises an insert member 9 which is mounted between two adjacent cleats 12 and which is pressed outwardly by springs 10 (FIG. 2). Each insert member 9 extends through the entire width of the casing 3. Furthermore, each insert member 9 carries two curved pressure pieces 6 which may be made of a resilient material and which are swingably mounted upon opposite ends of insert member, so that they may have the proper inclination when sliding upon the elliptical inner surface of the casing 3 (FIG. 5). For that purpose each pressure piece 6 carries a pin 7 inserted into a suitable bore hole provided in the insert member. A coiled spring 30 is located in each bore hole and exerts an outwardly directed pressure against the pressure piece. Flow of gases is also prevented by the above-described sealing members 13 carried by the cleats 12 and pressed against the sides of the casing 3 by springs 14. Thus the interior of the casing 3 is effectively separated by the pressure pieces 6 and the sealing members 13 into intake, compression and combustion chambers throughout the rotation of the rotor. As shown in FIG. 5, each of the seals 5 has four narrow openings 28 for the passage of oil; this oil lubricates the seals 5, the inner walls of the combustion chamber 3d, the pins 7 as well as the pressure pieces 6.

The pressure pieces 6 along with the underlying surfaces of the combustion chamber 3d actually enclose closed chambers 5a (FIG. 2) which contain oil vapors and protect these oil vapors from the burning gases. These oil vapors continuously lubricate those surfaces of the combustion chamber which are exposed to the burning gases; these surfaces are constituted by an angular projection of about 75% of surface. The cleats 12 are provided with longitudial grooves 12b for the flow of oil, as well as with transverse passages 12a adjacent the inserts 9 which also serve for the transmission of oil.

OPERATION

Since the engine of the present invention follows the usual cycle of intake, compression, ignition and exhaust of a rotary internal combustion engine of the type described in the previously mentioned U.S. Patent No. 2,947,290, this cycle will not be described in detail herein.

FIGURE 2 illustrates the rotor of the engine at the critical point of compression and ignition. At that time the levers are so located that a forward rotary movement will result. The relative positions of the two lowermost levers 18 at that moment are indicated at 3b in FIG. 2 by broken lines and the ratio 2.8:2. At that time the angle between a corner of the rotor and the center of the adjacent lever is about 16°. This arrangement is most important since it makes it possible to ignite the engine quickly at the time of the critical compression.

It is apparent that in the course of the rotation of the rotor, the rollers 19 will move in the recesses of the plates 17a and 17b in such manner that the shaft 24 will be rotated. FIGURE 2 shows the left-hand rollers 19 (illustrated in full lines) in its uppermost position relatively to its annular recess, while the lower right-hand roller is in a position in which it is closest to the center of the rotor. The difference in the angle between the rotor and the shaft will be compensated and the load will be evenly distributed between all three conrers of the rotor.

The advantage of this arrangement is that the speed of the rotor can be conveniently maintained at about 6,000 to 8,000 r.p.m.; the force of gas pressure is always directly proportional to the load on the motor. Furthermore, in this construction there is no idle movement of the rotor relatively to the shaft, while complete compressive isolation of each sector furthers the precision of the cycle.

The described system of lubrication has the advantage that during rotation the centrifugal force will act on each drop of oil. Thus the oil drops introduced into the pipes 23a and 32 through the inlet 23a will be pulverized and will be continuously urged by the same centrifugal force to move toward the outlets of the pipes. Due to the direction of the outlets, oil will leave them in a pulverized state, so that the oil drops will be able to lubricate the entire engine. Thus oil vapors will settle on every part within the combustion chamber 3d, resulting in the best possible and most economical lubrication. The amount of lubricating oil required for smooth motor operation will be extremely small, possibly less than, or at most equal to the amount of oil required for lubrication of conventional engines.

Due to the use of centrifugal forces for the transmission of oil, this lubrication system does not require the use of any oil pumps or other extraneous mechanisms. The amount of oil required to be transmitted to the inlet 23a can be easily regulated depending upon the operative r.p.m. of the motor.

Oil is not only precipitated upon the walls of the combustion chamber 3d but, due to the rotation of the rotor, it will flow through channels provided in the corners of the rotor inside the seals 5 and pressure pieces 6. Oil will flow through the four openings 28 of the seals 5, the passages 12a and the grooves 12b of the cleats 12 so that all the cleats will be lubricated. Oil will also flow through the passages 29 and the openings 28 of the seals 5. Furthermore, oil vapors will be collected in the chambers 5a enclosed by the pressure pieces 6 and will move along with the chambers 5a upon the inner surfaces of the combustion chamber 3d, thereby providing continuous lubrication.

It should be noted in this connection that in the described construction compressive independence of each sector is completely assured. At the moment of ignition the sides of the pressure pieces 6 extend at such angle to the inner surfaces of the combustion chamber, that the expanding gases press them sideways in directions toward the inner surfaces and not toward the center. The smallest change in the positions of the pressure pieces is compensated by the above-described springs.

It is apparent that the described rotary engine provides a most efficient combination of an elliptical combustion chamber with a triangular rotor located therein. Sharp changes in the movement of the engine are completely eliminated. The arrangement of the rollers carried by the rotating levers is such that each of the three corners of the rotor carries an equally divided load, whereby the rotor moves smoothly at a uniform speed along its elliptical orbit without being subjected to any detrimental effects as the result of the eccentricity.

A further advantage of this engine is the fact that all its strokes are completed in one cycle, while the described location of the levers at the time of the ignition provides the rotor with a most effective forward thrust.

Another most important advantage results from the use of seals 5 which along with the pressure pieces 6 are located 120° apart and effectively separate each sector from another. Since the combustion chamber 3d is of elliptical shape formed by three radii, this system is necessary to preserve sectional isolation. The use of six pressure pieces 6 (two for each seal) not only provides complete isolation between the sectors at all times of the engine cycle but also reduces friction at each corner of the rotor by one half; this, along with the possibility of reducing the speed of the engine by one half greatly diminishes wear upon the critical parts of the engine.

The semi-circular pressure pieces 6 due to their shape, constitute excellent oiling chambers and serve the purpose of lubricating the inner surfaces of the combustion chamber.

The entire construction is such that the rotor can rotate swiftly and safely without any interruption, while compression and lubrication are not detrimentally affected by the movements of the rotor.

The supply of oil through pipes carried by the central shaft and the distribution of oil by centrifugal forces into the three sectors of the combustion chamber provide for very efficient and economical lubrication of the system.

It is apparent that the example shown above has been given solely by way of illustration and not by way of limitation, and that it is subject to many variations and modifications within the scope of the present invention. All such variations and modifications are to be included within the scope of the present invention.

What is claimed is:

1. A rotary internal combustion engine, comprising a casing having inner surfaces enclosing a combustion chamber of elliptical cross-section, means providing ignition and combustion in said chamber, a shaft rotatably supported by said casing and extending centrally through said combustion chamber, a rotor having two alined side walls of substantially triangular outline and means interconnecting said side walls, said side walls having alined openings through which said shaft extends and which are larger than said shaft, three levers extending substantially at angles of 120° to each other and having inner ends firmly connected to said shaft, separate rollers carried by the outer ends of said levers, said side walls further having opposed indentations receiving said rollers and forming paths of movement for said rollers, projecting members carried by the three apices of the rotor of triangular outline, and resilient means continuously pressing said projecting members against the inner surfaces of said casing.

2. A rotary internal combustion engine in accordance with claim 1, wherein said levers form angles of substantially 16° with adjacent angular portions of said side walls during ignition.

3. A rotary internal combustion engine in accordance with claim 2, wherein said shaft is adapted to rotate in a predetermined direction and wherein at the moment of ignition said levers are advanced in the direction of rotation of said shaft at a ratio of 2.8:2.

4. A rotary internal combustion engine, comprising a casing having inner surfaces of elliptical outline and transverse flat surfaces, said surfaces enclosing a combustion chamber, means providing ignition and combustion in said chamber, a shaft rotatably supported by said casing and extending centrally through said combustion chamber, a rotor having two alined side walls of substantially triangular outline and cleats interconnecting said side walls and having curved surfaces located opposite said surfaces of elliptical outline, pressure members carried by said cleats, springs carried by said cleats and pressing said pressure member against said flat surfaces, said side walls having alined openings through which said shaft extends and which are larger than said shaft, three levers extending substantially at angles of 120° to each other and having inner ends firmly connected to said shaft, separate rollers carried by the outer ends of said levers, said side walls further having opposed indentations receiving said rollers and forming paths of movement for said rollers, projecting members carried by three apices of the rotor of triangular outline, and resilient means pressing said projecting members against the inner surfaces of said casing.

5. A rotary internal combustion engine, comprising a casing having inner surfaces of elliptical outline and transverse flat surfaces, said surfaces enclosing a combustion chamber, means providing ignition and combustion in said chamber, a shaft rotatably supported by said casing and extending centrally through said combustion chamber, a rotor having two alined side walls of substantially triangular outline and cleats interconnecting said side walls and having curved surfaces located opposite said surfaces of elliptical outline, pressure members carried by said cleats, spring carried by said cleats and pressing said pressure members against said flat surfaces, said side walls having alined openings through which said shaft extends and which are larger than said shaft, three levers extending substantially at angles of 120° to each other and having inner ends firmly connected to said shaft, separate rollers carried by the outer ends of said levers, said side walls further having opposed indentations receiving said rollers and forming paths of movement for said rollers, insert members carried by the three apices of the rotor of triangular outline, curved pressure pieces swingably mounted upon said insert members, and resilient means for pressing said pressure pieces against the inner surfaces of said casing.

6. A rotary internal combustion engine, comprising a casing having inner surfaces enclosing a combustion chamber of elliptical cross-section, means providing ignition and combustion in said chamber, a shaft rotatably supported by said casing and extending centrally through said combustion chamber, a rotor of substantially triangular outline located within said combustion chamber, said ignition and combustion means rotating said rotor in a predetermined direction, said rotor having openings through which said shaft extends with play, said rotor further having side indentations formed therein, driving means firmly connected with said shaft and having members extending with play into said indentations, whereby said shaft is rotated in the same direction as said rotor, said shaft having grooves circling the shaft in a direction opposed to the direction of rotation of the shaft, and lubricant-carrying pipes fixed in said grooves, said pipes having outlets opening into said chamber and having a slope extending in a direction opposed to the direction of rotation of said shaft, projecting members carried by the three apices of the rotor of triangular outline, and resilient means continuously pressing said projecting members against the inner surfaces of said casing.

7. A rotary internal combustion engine, comprising a casing having inner surfaces of elliptical outline and transverse flat surfaces, said surfaces enclosing a combustion chamber, means providing ignition and combustion in said chamber, a shaft rotatably supported by said casing and extending centrally through said combustion chamber, a rotor having two alined side walls of substantially triangular outline and cleats interconnecting said side walls and having curved surfaces located opposite said surfaces of elliptical outline, said cleats having longitudinal oil-carrying grooves and transverse lubricating passages, pressure members carried by said cleats, springs carried by said cleats and pressing said pressure members against said flat surfaces, said ignition and combustion means rotating said rotor in a predetermined direction, said side walls having alined openings through which said shaft extends and which are larger than said shaft, three levers extending substantially at angles of 120° to each other and having inner ends firmly connected to said shaft, separate rollers carried by the outer ends of said levers, said side walls further having opposed indentations receiving said rollers and forming paths of movement for said rollers, whereby said shaft is rotated in the same direction as said rotor, said shaft having grooves circling the shaft in a direction opposed to the direction of rotation of the shaft, lubricant-carrying pipes fixed in said grooves, said pipes having outlets opening into said chamber and having a slope extending in a direction opposed to the direction of rotation of said shaft, insert members carried by the three apices of the rotor of triangular outline, pins carried by said insert members, pressure pieces of semi-circular cross-section swingably carried by said pins, and resilient means for pressing said pressure pieces against the inner and side surfaces of said casing, said insert members having lubricating passages, said pressure pieces having passages for oil vapors and enclosing chambers adapted to contain said oil vapors.

References Cited by the Examiner

UNITED STATES PATENTS

| | | | |
|---|---|---|---|
| 1,279,195 | 9/18 | Whitmore | 123—16 |
| 1,324,759 | 12/19 | Berglof | 123—16 |
| 1,792,026 | 2/31 | Nichols | 123—16 |
| 1,901,787 | 3/33 | White | 123—16 |
| 2,085,770 | 7/37 | Seeck | 74—69 |
| 2,864,346 | 12/58 | Taylor | 123—16 |
| 2,871,831 | 2/59 | Patin | 123—8 |
| 2,947,290 | 8/60 | Froede | 123—8 |
| 2,988,065 | 6/61 | Wankel et al. | 123—12 |
| 3,056,391 | 10/62 | Hoadley. | |

KARL J. ALBRECHT, *Primary Examiner.*

JOSEPH H. BRANSON, JR., *Examiner.*